US009052817B2

(12) United States Patent
Hotelling

(10) Patent No.: US 9,052,817 B2
(45) Date of Patent: Jun. 9, 2015

(54) MODE SENSITIVE PROCESSING OF TOUCH DATA

(75) Inventor: Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1741 days.

(21) Appl. No.: 11/818,334

(22) Filed: Jun. 13, 2007

(65) Prior Publication Data

US 2008/0309624 A1 Dec. 18, 2008

(51) Int. Cl.
| | |
|---|---|
| G09G 5/00 | (2006.01) |
| G06F 3/041 | (2006.01) |
| G06F 3/048 | (2013.01) |
| G06F 3/0488 | (2013.01) |

(52) U.S. Cl.
CPC .. *G06F 3/04883* (2013.01); *G06F 2203/04808* (2013.01)

(58) Field of Classification Search
USPC .......................................... 345/173
See application file for complete search history.

(56) References Cited

U.S. PATENT DOCUMENTS

| | | | |
|---|---|---|---|
| 4,937,762 A * | 6/1990 | Todome | 358/1.2 |
| 4,996,640 A | 2/1991 | Yamada et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,854,450 A | 12/1998 | Kent | |
| 5,880,411 A | 3/1999 | Gillespie et al. | |
| 6,154,210 A * | 11/2000 | Anderson | 715/840 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,023,428 B2 * | 4/2006 | Pihlaja | 345/173 |
| 7,184,064 B2 | 2/2007 | Zimmerman et al. | |
| 7,429,993 B2 * | 9/2008 | Hui | 345/629 |

(Continued)

FOREIGN PATENT DOCUMENTS

| | | |
|---|---|---|
| FR | 2866726 | 8/2005 |
| JP | 2000-163031 A | 6/2000 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Seokyun Moon
(74) *Attorney, Agent, or Firm* — Morrison & Foerster LLP

(57) ABSTRACT

Embodiments of the present invention provide for a hardware or software utility layer operating at a multi-touch enabled device that can perform application aware processing of touch data. More specifically, various applications executing at the device can send to the utility layer definitions of the types of touch data they require from the multi-touch enabled display. The utility layer can then process incoming touch data in relation to these definitions and send back to the applications result data in a format requested by the applications. Thus, the computational load associated with processing of touch data can be decreased. Also, in certain cases, applications can obtain more accurate data than available in prior systems.

61 Claims, 8 Drawing Sheets

(56) References Cited

U.S. PATENT DOCUMENTS

| | | |
|---|---|---|
| 7,495,659 B2 | 2/2009 | Marriott et al. |
| 7,663,607 B2 | 2/2010 | Hotelling et al. |
| 8,436,829 B1 * | 5/2013 | Zhai et al. ............... 345/173 |
| 8,479,122 B2 | 7/2013 | Hotelling et al. |
| 2003/0164820 A1 | 9/2003 | Kent |
| 2003/0193481 A1 * | 10/2003 | Sokolsky ............... 345/173 |
| 2003/0210270 A1 | 11/2003 | Clow et al. |
| 2004/0204129 A1 | 10/2004 | Payne et al. |
| 2004/0261039 A1 * | 12/2004 | Pagan ................... 715/797 |
| 2006/0026521 A1 | 2/2006 | Hotelling et al. |
| 2006/0038796 A1 * | 2/2006 | Hinckley et al. ......... 345/173 |
| 2006/0046819 A1 * | 3/2006 | Nguyen et al. ............. 463/16 |
| 2006/0097991 A1 * | 5/2006 | Hotelling et al. ......... 345/173 |
| 2006/0181519 A1 | 8/2006 | Vernier et al. |
| 2006/0197753 A1 | 9/2006 | Hotelling |
| 2006/0244735 A1 * | 11/2006 | Wilson ................... 345/173 |
| 2006/0274046 A1 | 12/2006 | Hillis et al. |
| 2007/0198926 A1 | 8/2007 | Joguet et al. |
| 2008/0158172 A1 | 7/2008 | Hotelling et al. |

FOREIGN PATENT DOCUMENTS

| | | |
|---|---|---|
| JP | 2002-342033 A | 11/2002 |
| WO | WO 00/31614 A1 | 6/2000 |
| WO | WO 03/062978 A3 | 7/2003 |
| WO | WO 2006/020304 A3 | 2/2006 |
| WO | WO 2006/094308 A3 | 9/2006 |
| WO | WO-2008/157250 A1 | 12/2008 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Aug. 29, 2008, for PCT Application No. PCT/US2008/066751, filed Jun. 12, 2008, three pages.

Search Report completed Apr. 14, 2009, for NL Application No. 2001670, four pages.

Schiphorst T. et al., "Using a Gestural Interface Toolkit for Tactile Input to a Dynamic Virtual Space," CHI 2002 Conference Proceedings, Conference on Human Factors in Computing Systems, Apr. 20-25, 2003, Minneapolis, Minnesota, pp. 754-755, ISBN 978-1-58113-453-7.

* cited by examiner

MODE SENSITIVE PROCESSING OF TOUCH DATA

FIELD OF THE INVENTION

This relates to user interfaces and more particularly to user interfaces for devices featuring multi-touch displays.

BACKGROUND OF THE INVENTION

A mouse is a well known and relatively simple user interface tool used in many computing devices. The input provided by a mouse can be relatively simple—a location and the state of various buttons or scroll-wheels featured by the mouse. Many existing touch screen devices provide functionality similar to that of a mouse by allowing a user to specify a single particular location by pressing a stylus or a finger against it.

Existing operating systems (OSs) can provide, for software applications running thereon, various tools intended to make user interaction via a graphical user interface and a mouse or a mouse-like user input easier. For example, an OS utility can allow a software application to define and register a widget (e.g., a button or a scroll bar). The OS utility can track when the user clicks on the widget with a mouse and can alert the software application. This eases and simplifies the development of software applications because each application need not keep track of mouse movements.

Recent developments in user interface technology have brought forth the multi-touch panel. An exemplary multi-touch panel is described in U.S. patent application Ser. No. 11/649,998 filed on Jan. 3, 2007 and entitled "Proximity and Multi-Touch Sensor Detection and Demodulation" (incorporated by reference herein in its entirety).

One of the advantages of a multi-touch panel can be that it detects multiple touch events at multiple locations on the panel at the same time. Thus, a multi-touch panel can provide not only a single location of interaction (as many existing touch panels) but a map of all the parts of the panel that are presently being touched. This can allow for much richer user interaction than previous input devices.

However, a multi-touch panel can also require that much more data be processed by various applications taking advantage of it. Specifically, applications utilizing a multi-touch panel may need to process an entire map specifying the locations being currently touched, instead of a single mouse click location. This can result in much higher processing requirements for running applications on a multi-touch enabled device.

SUMMARY OF THE INVENTION

This relates to a multi-touch enabled device that can include a hardware or software utility layer that can perform application aware processing of touch data. More specifically, various applications executing at the device can send to the utility layer definitions of the types of touch data they require from the multi-touch enabled display. The utility layer can then process incoming touch data in relation to these definitions and send back to the applications result data in a format requested by the applications. Thus, the computational load associated with processing of touch data can be decreased. Also, in certain cases, applications can obtain more accurate data than available in prior systems.

Applications executing at a multi-touch enabled device may define the type of touch data they require in terms of control instances. Control instances may define various ways a user can communicate with or control applications running at the multi-touch enabled device. Control instances can be, for example, buttons, sliders, knobs, navigation pads, etc. Each control instance together with an associated control type can define the type of results that are needed for that control instance, and how these results are to be calculated.

Thus, the applications can pass one or more control instances to the utility layer and the utility layer can process incoming touch data in light of the control instances and provide to the applications results that have been calculated in accordance with the control instances. Thus, for example, applications can receive a simple indication whether a button has been touched or whether and how far a slider has been moved without having to process geometrical touch data to obtain that information.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

This relates to processing of touch data at a lower layer of a multi-touch enabled device (e.g., at the OS) to form relatively simple touch events, so that the processing and communication bandwidth requirements at the application layer can be decreased.

Figure 1:
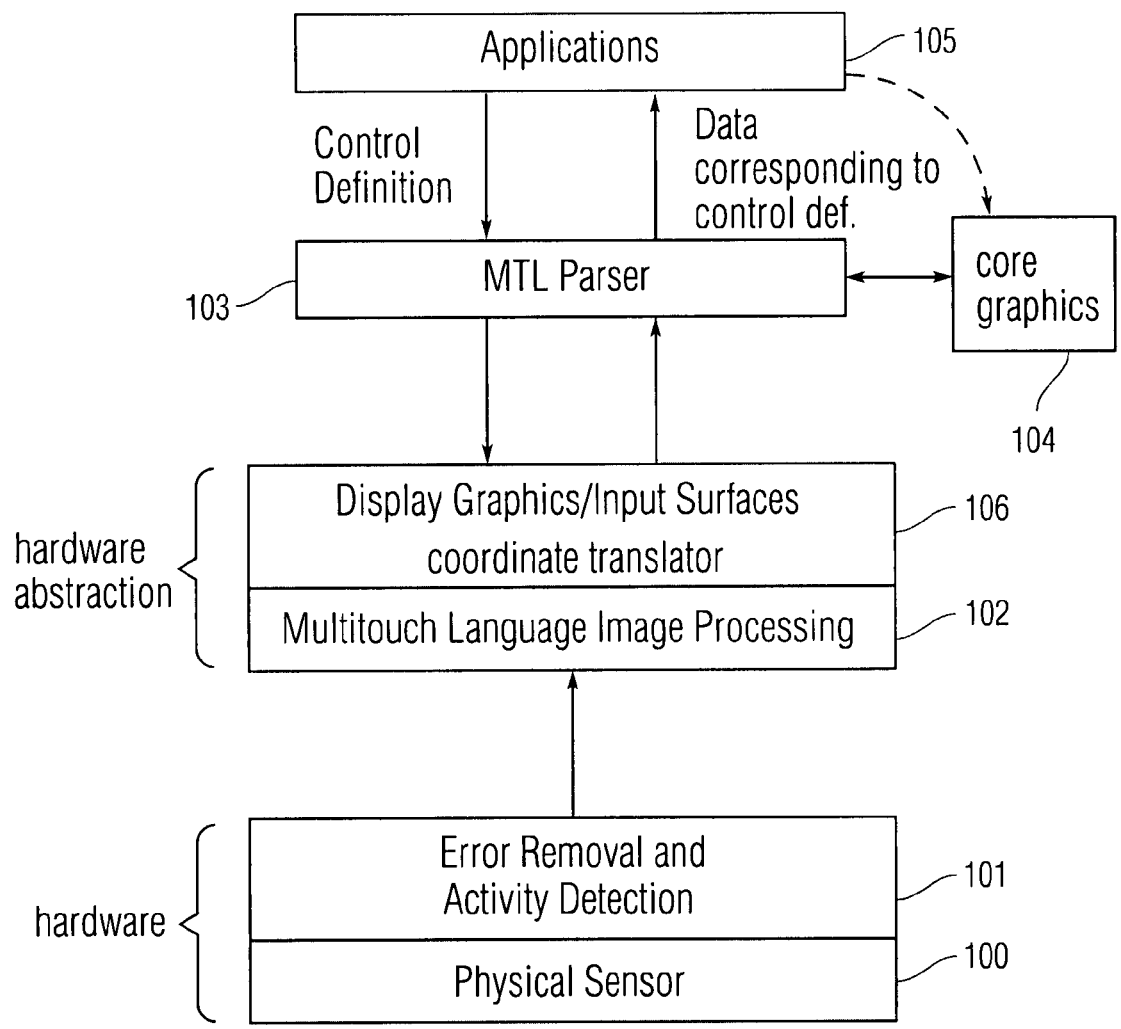
FIG. 1 is a diagram of an exemplary multi-touch enabled device according to one embodiment of this invention.

FIG. 1 is a diagram of an exemplary multi-touch enabled device according to embodiments of the invention. More specifically, FIG. 1 is a layer diagram of the touch data processing modules of a multi-touch device. The lowest layer can be physical multi-touch sensor 100. The physical sensor can be, for example, a multi-touch panel that senses touch events based on measurements of mutual capacitance (e.g. the multi-touch panel of U.S. patent application Ser. No. 11/649,998, discussed above). The multi-touch panel can be superimposed onto a display or even integrated within a display, so that a user can interact with the device by touching a display. U.S. patent application Ser. No. 11/649,998 filed on Jan. 3, 2007 and entitled "Proximity and Multi-Touch Sensor Detection and Demodulation" (incorporated by reference herein in its entirety) teaches combining a multi-touch panel and a display. The physical sensor can also include circuitry for processing and/or digitizing data obtained by the multi-touch panel. In some embodiments the physical sensor can be configured to sense whether certain predefined touch pixels are being touched or not. In others, the physical sensor can also sense the pressure, or intensity with which various pixels are being touched.

Error removal and activity detection module 101 can take in data from the physical sensor and perform various error removal operations on it. Error removal can include removing data that ordinarily would not be caused by an intentional touch event. Furthermore, module 101 can also perform activity detection. Thus, it can detect whether any touch activity is occurring and, if that is not the case, remove (i.e., not pass on to the next layer) the incoming touch data. Thus, power can be preserved by avoiding the unnecessary processing of touch data. Layers 100 and 101 can be parts of a hardware layer.

Layers 102 and 106 can be parts of a hardware abstraction layer. The hardware abstraction layer can be provided to give upper layers more useful multi-touch data. Layers 102 and 106 can be hardware or software. Multi-touch language processing layer 102 can be used to process raw data signifying sensed voltages (which themselves signify mutual capacitances at various touch pixels) into processed touch data. The processed touch data can be based on coordinates of touch pixels, and can include a binary value indicating whether a pixel is being touched or not. In other embodiments, the processed touch data can include other or additional data, such as a value indicating the strength with which a pixel is being touched for each pixel. The processed touch data can be thought of as an image, wherein each pixel of an image can indicate whether a corresponding pixel is being touched (or how strongly it is being touched).

Display graphics/input surface coordinate translator layer 106 can be used to translate the processed touch data from touch panel coordinates to display coordinates. For practical reasons the smallest area at which a touch event can be sensed (e.g., a touch pixel) can be larger than a display pixel. Usually, because of the size of the human fingers, touch resolution does not need to be as high as display resolution. However, it can be useful to have the touch data be based on the same coordinate system as the display data in order to correlate touch events with elements being displayed on the screen (e.g. buttons, etc.). For this purpose, the display graphics/input surface coordinate translator can be used to translate the touch data to display coordinates. The display graphics/input surface coordinate translator can send the translated touch data to MTL parser 103. The data the MTL parser receives can be raster data. In other words, it can include one or more arrays of touch values associated with respective touch pixels.

Multi-touch language (MTL) parser layer 103 can display the coordinate based touch data and utilize it to provide a high level control-based interface to applications layer 105. Applications layer 105 can include one or more applications, such as a telephone directory, email, a map application, a video or picture viewer, etc.

Figure 2:
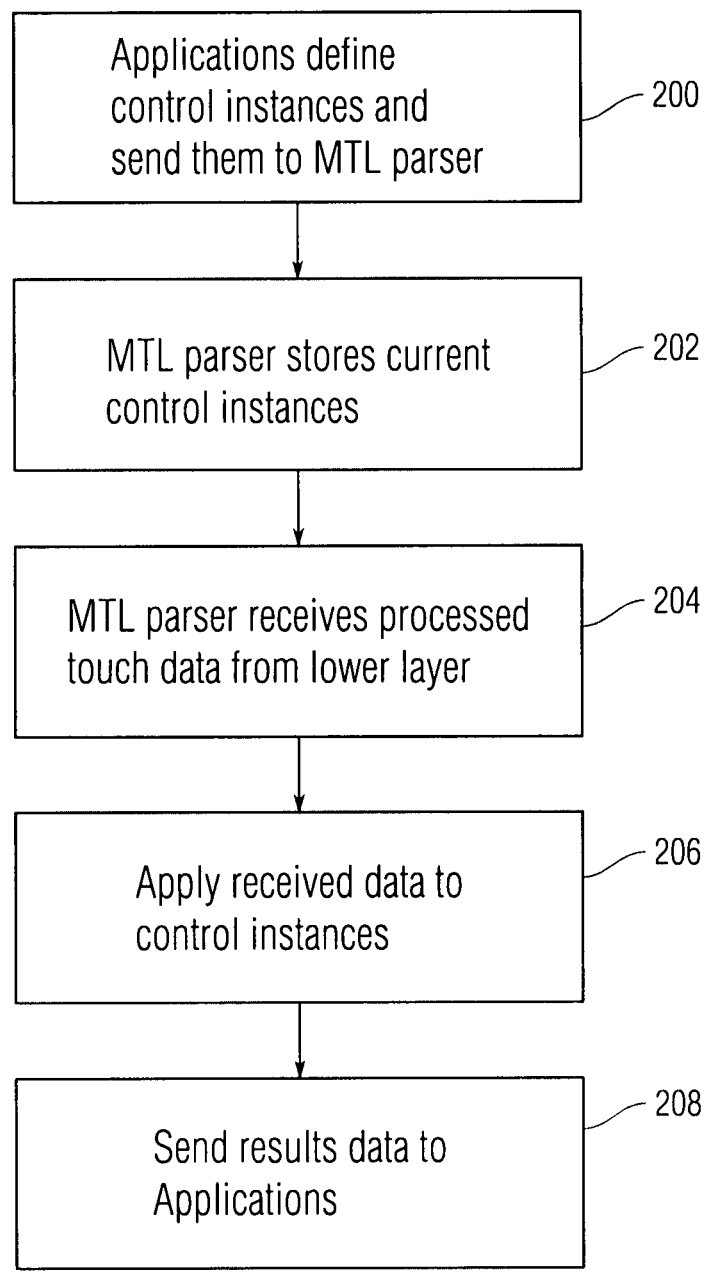
FIG. 2 is a flowchart showing an exemplary method of operation of the applications and MTL parser layers according to one embodiment of this invention.

The operation of applications and MTL Parser layers is described in more detail in FIG. 2. At step 200, one or more applications can define one or more control instances and send them to the MTL parser. A control instance can be an element of user interaction. It can be a button, a knob, a slider etc. A control instance can include a visual representation and carry with it touch functionality—i.e., a user can touch a control instance appearing on a display in order to communicate with the application that created the control instance. Thus a user can touch a button to press it, drag a slider to move it or place his/her fingers on top of a knob and turn them in order to turn the knob.

The control instances created by the application can be instances of one or more data types. The types can correspond to various types of controls, such as knobs, buttons, sliders, etc. The instances can include data identifying the size/shape of the control, the position of the control, etc. In some embodiments, the instance can also include data defining the visual appearance of the control. In other embodiments, the applications can communicate with other modules (such as, e.g., core graphics 104) in order to define the visual appearances of controls. Applications can continuously define new control instances, and or move or delete older control instances by communicating with the MTL parser.

At step 202, the MTL parser can store all current control instances. At step 204, the MTL parser can receive processed touch data from a lower layer (such as the display graphics/input surface translator). At step 206, the MTL parser can apply the received data to the stored control instances, in order to determine interactions with the instances—i.e., whether buttons have been pressed, knobs turned, etc.

For example, the MTL parser can examine the area defined by a button instance and check whether the processed touch data shows any touch events within that area. In some instances the MTL parser may need to apply a control instance to historical touch data as well as current touch data in order to determine how a user is interacting with that instance. For example, for a knob, the MTL parser may need to examine previous positions of touches on and around a knob as well as their current positions to determine whether the knob is being turned. The MTL parser can achieve this by storing historical processed touch data and processing it during step 206. Alternatively, the MTL parse can store intermediate data that is specific for each control type. For example, if a single control instance of the knob type is present, the MTL parser can keep only historical touch data for the area defined by that instance and only keep the historical data for a specific back period necessary to determine knob turning (e.g., it can keep only one previous frame of data). Some controls that use historical data can also be referred to as incremental controls, as they often only use historical data from a previous frame and thus measure incremental changes.

At step 208, the MTL parser can send various results data obtained in step 206 to various applications. The results data can be related to the control instances that the applications sent the parser. More specifically, the results data can be associated with the control types which define the control instances. Thus, for example, a simple button type can define as its results data a binary value which indicates whether the button is being pressed or not. A knob control type can define as its results data an integer indicating an angle of rotation of the knob.

Thus, embodiments of the invention can greatly ease application programming and reduce the amount of data that applications have to process, by providing a lower level MTL parser layer which sends applications compact and simple to use results data. Furthermore, since the MTL parser can be aware of all control instances, it can keep track of the areas of the display for which touch data is relevant to the applications (i.e., there are control instances in that area) and for which it is not. Thus, the MTL parser can improve efficiency by not processing touch data for irrelevant areas. Furthermore, the MTL parser can improve the efficiency of layers below it by instructing them not to process irrelevant data. In some embodiments, the MTL parser can even instruct the touch panel itself not to process touch data from irrelevant regions of the panel. This can save power, as the touch panel can turn off a stimulation signal (necessary for touch sensing, according to some embodiments).

In previous systems the MTL parser processes touch data without being aware of the various control elements being displayed by different applications. Thus, the parser can process touch data in a standard format. For example, the parser can group pixels that have been touched into touch regions, fit the touch regions to ellipses (and/or other easily definable shapes) and send data defining the various ellipses or other shapes to the applications. The applications would then have to process these shapes and compare them to controls the applications are displaying on the screen to determine whether and how the user is interacting with these controls. Some embodiments of the invention can include the latter described functionality together with the above discussed advanced control type based functionality in order to support legacy applications and/or to support some instances in which the control type based functionality may not be optimal.

While it may, at first glance, seem that the legacy systems can allow for higher level of precision because they pass actual touch data to the applications, this may not always be the case. For example, in some cases the control instance-based systems of the present invention can more accurately determine the intention of the user than legacy systems. Legacy systems usually compress the touch data before passing it to the applications (e.g. by converting it to ellipses and other shapes as discussed above) in order to be practical. However, the compressed data may not correctly convey the user's intent. On the other hand, according to embodiments of the invention the MTL parser can process control instances of each control type differently. Thus, the control types can be predefined to most correctly interpret the intent of the user. Therefore, even if embodiments of the invention may not actually pass touch data to the applications, they may allow the applications to more accurately interpret user intent.

Furthermore, a person skilled in the art would recognize that embodiments of this invention can require much less processing than the legacy systems. In the legacy systems, the parser may need to process and send to the applications all or most incoming touch data as it is not aware what type of data the applications need. In additions the applications would have to again process the data received by the parser to determine how it applies to the particular controls used by the applications. In embodiments of the present invention, the parser is aware what touch data the applications need and can do only as much processing as is relevant to the applications. Furthermore, the parser sends to the applications data that is already associated with the applications' controls, minimizing or completely eliminating the processing the applications need to do for incoming touch data.

Figure 3:
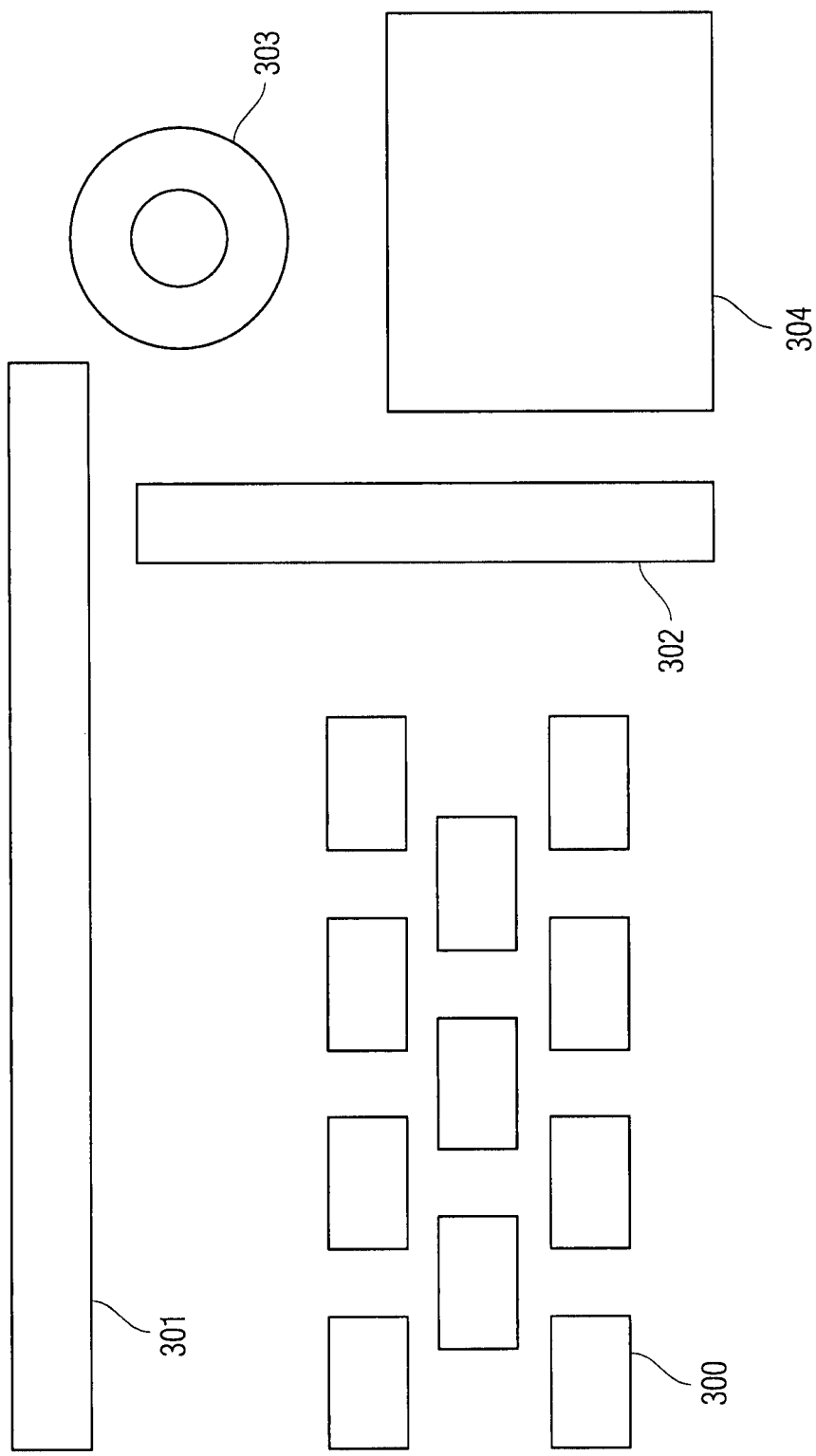
FIG. 3 is a diagram showing various exemplary control instances of different control types as displayed on a screen according to one embodiment of this invention.

FIG. 3 shows various control instances of different control types as displayed on a screen. For example, one or more button type instances (such as button 300) can be used. A button can be used to detect whether a user presses or depresses the button. Slider controls 301 and 302 can also be used. Sliders can detect when a user slides his/her fingers along the control. A rotational or knob control (such as knob 303) can also be used. A knob control can detect rotation of fingers pressed against the knob. Slider and knob controls can be the type of controls that require historical data. Thus, the MTL parser can compare previous touch states of the slider or knob with current ones to determine if sliding and/or rotation is occurring. Furthermore, touch pad control 304 can be used. A touch pad control can be intended to emulate a computer notebook touchpad, and can be used to detect various touch events at the touch pad. The touch pad control may also provide functionality additional to that of the ordinary notebook computer touchpad by detecting more complex events, such as spreading of fingers, etc. Thus, for example, the touch pad control can be a navigation surface that detects the lateral motion of the hand, pressure of the hand on the surface, spreading and contraction of the hand, rotation of the hand on the surface, and the number of contact patches on the surface.

Figure 4:
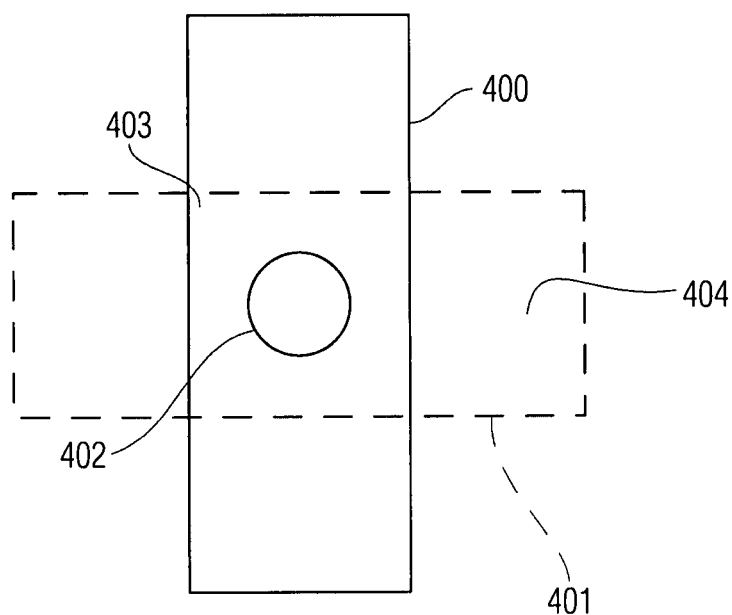
FIG. 4 is a diagram showing the transparency and/or opaqueness of exemplary controls according to one embodiment of this invention.

FIG. 4 shows transparency and/or opaqueness options for controls according to embodiments of the invention. According to some embodiments, various controls can be superimposed or defined so that they both cover the same area. Thus, for example, controls 400 and 401 can both cover intersecting area 403. Some embodiments allow for the controls to be defined as transparent or opaque. In case of transparent controls, both controls detect touch events in the common area, in the same manner as they would if there was no superimposition. Thus, if controls 400 and 401 are both buttons and a finger is pressed in area 402, both controls can detect the touching of the finger.

According to some embodiments controls can be opaque. When opacity is used, various control instances can include a level parameter. A opaque control instance can shield any control instances that are under it and intersect at least some of its area. In some embodiments, the instances with the lowest level parameter can be considered to be the highest level (i.e., with all other instances being under them), but other arrangements are possible. Thus, assuming that instance 400 can be opaque and at a higher level than instance 401, then instance 400 can shield instance 401 (i.e., prevent touch events from registering at instance 401). In some embodiments, shielding only happens in the areas in which the opaque instance superimposes the instance under it. Thus, for the FIG. 4 example, shielding can occur at the superimposed area 403 (thus shielding touch 402), but not at area 404 where there is no superimposition.

In some embodiments which sense strength or pressure of touching in addition to touch events, opaqueness of controls can be partial. A partially opaque control may not completely shield the control under it, but merely reduce the strength of touch events for the control under it.

The description below discusses a range of embodiments of the invention in detail. According to these present embodiments, MTL controls can use the following definitions:
definition of the region for the control: "Control Regions";
definition of the types of controls, including what kind of output data is desired from the control: "Control Type Definitions" (these reference control region Definitions;
definition of instances of controls, with the X,Y locations for each control: "Control Instances" or simply "Controls" which reference Control Types.

Once Control Instances are defined, Control Output data (or results data) can be generated by any control instance which is currently experiencing user activity. Usually, controls which are not being actively used can be "quiet" and not output data.

The Control Output data can include:
Number of controls that are currently active;
For each active control:
CTRLID—a control ID code that associates the output data with the control instance
Dataset—a set of data that provides additional information regarding the state of the control, or incremental state of the control since the last output data report. For the special case of a button, Dataset is not necessary, because the presence of CTRLID can be adequate to indicate that the button is currently pressed.

A control instance can be an actual control, for example, a button. Control instances can reference control types, which can be defined prior to the definition of control instances. For example, a control type can describe the shape and behavior of a button. Many control instances can reference the same control type (e.g., many control instances can reference a button in order to construct a virtual keyboard).

Controls can overlap each other, in an analogous fashion to overlapping graphical objects on a display. Order (defined in the control instance) and an Opacity parameter (defined in the control type) can be used to determine the behavior of overlapping controls as follows:

For opaque controls, the controls which are processed first (lowest Order numbers) extract signal from the raw image according to their region masks, and subtract the used signal so that it IS NOT accessible to controls that are processed later (higher Order numbers).

For transparent controls, they extract signal from the raw image according to the region mask, but they do not subtract the used signal, so the used signal IS available for re-use by controls that are processed later.

An analogy to overlapping objects in a display can be extended: Opaque controls with the lowest order numbers can be analogous to display objects nearest the user, which obscure the visibility of display objects which are further from the user. Transparent controls can be analogous to transparent display objects, because display objects further from the user can still be seen through the transparent controls.

TABLE 1

(Control Instance Parameters)

| | Description | Type | Meaning |
|---|---|---|---|
| Control Instance Definition Input Parameter | | | |
| T | Handle to control type | unsigned int | label |
| X | X coordinate of control bounding box lower left corner | unsigned byte | input pixels |
| Y | Y coordinate of control bounding box lower left corner | unsigned byte | input pixels |
| Order | Control processing order, first to last. | unsigned int | 0 = processed first, 1 = $2^{nd}$, 2 = $3^{rd}$, etc. |
| Control Instance Definition Output parameter | | | |
| CTRLID | Control instance ID code to associate output report data with control instance definition | unsigned int | Unique ID for control instance |

Control regions can be re-usable definitions of shapes which can be referenced by control types. More than one control type can reference the same control region. Coordinates can be relative to the local origin, which can be specified in the Control Instance. The local origin can be defined as the lower left corner of the bounding box.

A rectangular region definition can define a simple rectangular region. All area within the rectangle can be active for input of the type specified by the control type.

TABLE 2

(Rectangular Region)

| | Description | Type | Meaning |
|---|---|---|---|
| Input parameter | | | |
| M | Bounding Box Height (Y dimension) | unsigned byte | Input pixels |
| N | Bounding Box Length (X dimension) | unsigned byte | Input pixels |
| Output parameter | | | |
| R | Handle to region - can be referenced by control type definitions | unsigned int | Label |

A binary mask region definition can define an arbitrary shape within simple rectangular bounding box. All area associated with a "1" can be active for input of the type specified by the control type. All area associated with a "0" can be inactive for input.

TABLE 3

(Bounding Mask)

| | Description | Type | Meaning |
|---|---|---|---|
| Input parameter | | | |
| M | Bounding Box Height (Y dimension) | unsigned byte | Input pixels |
| N | Bounding Box Length (X dimension) | unsigned byte | Input pixels |
| Mask | Binary array, 2D image, defining active and non-active areas within the bounding box | array of bits of size M X N | 1 = active, 0 = non-active |
| Output parameter | | | |
| R | Handle to region - can be referenced by control type definitions | unsigned int | label |

A graded mask region definition can define an arbitrary shape with graded sensitivity within simple rectangular bounding box. At each element, a scalar value can determine the relative sensitivity at that point. All pixels with a "0" can be inactive for input. Pixels with "255" can be fully sensitive. Pixels with "127" can be 50% sensitive.

TABLE 4

(Graded Mask)

| | Description | Type | Meaning |
|---|---|---|---|
| Input parameter | | | |
| M | Bounding Box Height (Y dimension) | unsigned byte | Input pixels |
| N | Bounding Box Length (X dimension) | unsigned byte | Input pixels |

TABLE 4-continued (Graded Mask)

| | Description | Type | Meaning |
|---|---|---|---|
| Mask | Unsigned byte array, 2D image, defining active and non-active areas within the bounding box | Array of unsigned bytes of size M X N | 255 = fully sensitive, 0 = non-sensitive |
| Output parameter | | | |
| R | Handle to region - can be referenced by control type definitions | unsigned int | label |

Control types can reference region definitions and add functional requirements in order to form functional, reusable control types that can be used to invoke multiple control instances. An example of a specific control type definition can be the description of a keyboard button. There can be two main control type families: (i) button control types and (ii) Multi-DOF control types.

Multi-DOF control types refer to control types that allow multiple degrees of freedom. They can provide a configurable set of output parameters that can be classified into Group outputs and Multi-Point Outputs:

Group outputs can be parameters which make use of all of the contact patches found on the control region. These outputs can be optimized for smooth pressure tracking, smooth XY tracking, smooth rotation tracking, smooth R tracking and estimated number of blob tracking. These can perform better than Multi-Point outputs during conditions of contact patch merging & separation.

Multi-Point outputs can be lists of contact patches with attributes for each contact patch. These can perform well when contact patches are separated, but may not perform as well as Group outputs during conditions of contact patch merging and separation.

In addition to Group vs. Multi-Point, outputs can be broadly categorized as Instantaneous or Incremental. Instantaneous outputs need not depend on previous image data. Some of the instantaneous outputs can change abruptly as new contact patches are included, excluded, merged into a common area, or contact patches are separated from a common area. Incremental outputs can use both the current image as well as the last image. The goal for incremental outputs can be that they continue to provide continuous, smooth, meaningful data which truly represents the intent of the user, in spite of changes due to the addition, subtraction, merging or separation of contact patches. The individual outputs and associated calculations can be enabled/disabled by the Class parameters as defined in the control type definition, and illustrated in the following table.

TABLE 5

(Types of Outputs)

| | Instantaneous Outputs | Incremental Outputs |
|---|---|---|
| Group Outputs | CTRLID: Control Active<br>Class0: Ztot, AG<br>Class1: XG, YG<br>Class2: RG<br>Class3: NBG<br>Class4: ThetaG, ECG | Class5: XGinc, YGinc<br>Class6: RGinc<br>Class7: ThetaGinc |
| Multi Point Outputs | Class8: NPTS, for each point: PTID, Z, A, X, Y<br>Class 9: for each point: R, Theta, EC | |

The following table can illustrate exemplary control applications and the associated recommendation for control type and an example parameter mapping.

TABLE 6

(Exemplary Control Applications)

| Example Control Application | Example Control Type | | Example Parameter Mapping |
|---|---|---|---|
| On-screen keyboard | Button | CTRLID | Button Pressed |
| Virtual Gas-Pedal | Multi-DOF, Class0 | CTRLID | Gas pedal being used |
| | | Ztot | How hard the gas pedal is being pushed |
| "Single-touch" absolute cursor control | Multi-DOF, Class0, Class1 | CTRLID | Cursor being moved |
| | | Ztot | Use to determine button down or button up |
| | | XG, YG | Cursor absolute coordinate control |
| Trackpad with incremental cursor motion and scroll/pan outputs | Multi-DOF, Class0, Class3, Class5 | CTRLID | Trackpad being used |
| | | Ztot | Use to determine button down or button up when pointing |
| | | NBG | If NBG = 1, then pointing mode. If NBG>1, then navigation mode |
| | | XGinc, YGinc | For pointing mode, use for cursor relative (incremental) coordinate control. For navigation mode, then use for scroll/pan |
| Incremental trackpad-style navigation control with incremental cursor motion and scroll/pan/zoom/rotate outputs | Multi-DOF, Class0, Class3, Class5, Class6, Class7 | CTRLID | NavPad being used |
| | | Ztot | Use to determine button down or button up when pointing |
| | | NBG | If NBG = 1, then pointing mode. If NBG>1, then navigation mode |

TABLE 6-continued (Exemplary Control Applications)

| Example Control Application | Example Control Type | | Example Parameter Mapping |
|---|---|---|---|
| | | XGinc, YGinc | For pointing mode, use for cursor relative (incremental) coordinate control. For navigation mode, then use for scroll/pan |
| | | RGinc | For navigation mode, then use for zoom control |
| | | ThetaGinc | For navigation mode, then use for rotation control |
| Absolute manipulation interaction window | Multi-DOF, Class1, Class5, Class6, Class7 | CTRLID | Control being used |
| | | XG, YG | Use to determine absolute center for rotation of graphical object being manipulated |
| | | XGinc, YGinc | Lateral motion of graphical object being manipulated |
| | | RGinc | Scaling (or zoom factor) of object being manipulated |
| | | ThetaGinc | Rotation of object being manipulated |
| Gesture Interpretation Example: lays hands on surface to bring up amorphous keyboard | Multi-DOF, Class8, Can be transparent, lowest Order, to coexist with other controls | CTRLID NPTS, PTID, X, Y | Control being used When NPTS > 8 and the list of points approximates the contact pattern of a keyboard, then bring up the virtual keyboard |
| Fingerpainting, iTunes visualizer manipulation, etc. | Multi-DOF, Class8, Class9 | CTRLID NPTS, PTID, Z, A, X, Y, R, Theta, EC | Control being used Each point can be approximated by an equivalent ellipse, which could then be used to fingerpaint or whatever. |

A button control type can be a relatively simple control intended for on-screen keyboards.

TABLE 7

(Button Control Type)

| | Description | Type | Meaning |
|---|---|---|---|
| Button Control Type Definition Input Parameter | | | |
| H | Handle to region definition | unsigned int | label |
| ZDIV | Controls scaling of Ztot | unsigned byte | number of right shifts to perform on sum when computing Ztot |
| Zon | Threshold for button-on | unsigned int | When Ztot goes above Zon, button is on. |
| Zoff | Threshold for button-off | unsigned int | When Ztot goes below Zoff, button is off |
| Opc | Opacity control - determines whether signal used by this control region is available for subsequent overlapping controls with higher Order numbers | Binary | 1 = opaque, 0 = transparent |

TABLE 7-continued (Button Control Type)

| | Description | Type | Meaning |
|---|---|---|---|
| Button Control Type Definition Output Parameter | | | |
| T | Handle to control type - can be referenced by control instance | unsigned int | Label |
| Button Control Report Output Parameter | | | |
| CTRLID | Control instance ID code to associate output report data with control instance definition | unsigned int | Unique ID for control instance |

For the special case of a button, Dataset need not be necessary, because the presence of CTRLID in the output report list can be adequate to indicate that the button is currently pressed.

Some exemplary algorithms for processing touch data for button control types are described below. Image data in a region after error removal can be represented by unsigned byte array D(p,q) where p can represent the row number, from 0 (bottom) to M−1 (top) and q can represent column number, from 0 (left) to N−1 (right). When D(p,q)=0, no input signal may be sensed at this pixel. When D(p,q)=255, maximum signal can be being sensed at this pixel. For a rectangular mask:

$$Z(p,q)=D(p,q)$$

Binary mask data can be stored in an array of bits M(i,j) where i can represent the row number, from 0 (bottom) to Ylen−1 (top) and j can represent column number, from 0 (left) to Xlen−1 (right). Therefore, for a binary mask:

$$Z(p,q)=D(p,q)*M(p,q)$$

Graded mask data can be stored in an array of unsigned bytes G(i,j) where i can represent the row number, from 0 (bottom) to Ylen−1 (top) and j can represent column number, from 0 (left) to Xlen−1 (right).

$$Z(p, q) = \frac{D(p, q) * M(p, q)}{256}$$

Ztot can be calculated as follows:

$$Ztot = \frac{\sum_{p=0}^{M-1} \sum_{q=0}^{N-1} Z(p, q)}{2^{ZDIV}}$$

Button Thresholding can be performed according to the following:
```
If (BUTTON==OFF)
    If Ztot>Zon then BUTTON=ON
If (BUTTON==ON)
    If Ztot<Zoff then BUTTON=OFF
```
A Multi-DOF Control Type can be defined as follows:

TABLE 8

(Multi-DOF Control Type)

| Multi-DOF Control Type Definition Input Parameter | Description | Type | Meaning |
|---|---|---|---|
| H | Handle to region definition | unsigned int | label |
| ZDIV | Controls scaling of Ztot | unsigned byte | number of right shifts to perform on sum when computing Ztot |
| Zon | Threshold for control activation | unsigned int | When Ztot goes above Zon, control is active (output data is provided) |
| Zoff | Threshold for control de-activation | unsigned int | When Ztot goes below Zoff, control is not active (no output data) |
| Opc | Opacity control—determines whether signal used by this control region is available for subsequent overlapping controls with higher Order numbers | Binary | 1 = opaque, 0 = transparent |
| Class0 | Enable Class 0 parameters | Binary | 1 = on, 0 = off |
| Class1 | Enable Class 1 parameters | Binary | 1 = on, 0 = off |
| Class2 | Enable Class 2 parameters | Binary | 1 = on, 0 = off |
| Class3 | Enable Class 3 parameters | Binary | 1 = on, 0 = off |
| Class4 | Enable Class 4 parameters | Binary | 1 = on, 0 = off |
| Class5 | Enable Class 5 parameters | Binary | 1 = on, 0 = off |
| Class6 | Enable Class 6 parameters | Binary | 1 = on, 0 = off |
| Class7 | Enable Class 7 parameters | Binary | 1 = on, 0 = off |
| Class8 | Enable Class 8 parameters | Binary | 1 = on, 0 = off |
| Class9 | Enable Class 9 parameters | Binary | 1 = on, 0 = off |

TABLE 8-continued

| Multi-DOF Control Type Definition Output Parameter | Description | Type | Meaning |
|---|---|---|---|
| T | Handle to control type- can be referenced by control instance | unsigned int | Label |

| Multi-DOF Control Report Output Parameter | Description | Type | Meaning |
|---|---|---|---|
| CTRLID | Control instance ID code to associate output report data with control instance definition | unsigned int | Unique ID for control instance |
| Output parameters, only available when Class0 = 1 | | | |
| Ztot | Total integrated signal for the group | unsigned int | |
| AG | Total area of input pixels which have values higher than 50% of peak for the group | unsigned int | Input pixels |
| Output parameters, only available when Class2 = 1 | | | |
| XG | X coordinate of centroid for group | unsigned int | $\frac{1}{64}$ input pixels, relative to local bounding box |
| YG | Y coordinate of centroid for group | unsigned int | $\frac{1}{64}$ input pixels, relative to local bounding box |
| Output parameters, only available when Class2 = 1 | | | |
| RG | Measure of the average radius from centroid to signal in the contact patch. Analogous to radius of gyration | Integer | $\frac{1}{64}$ input pixels |
| Output parameters, only available when Class3 = 1 | | | |
| NBG | Estimate of number of "bumps" in the group | unsigned byte | Number of bumps |

| Multi-DOF Control Report Output Parameter | Description | Type | Meaning |
|---|---|---|---|
| Output parameters, only available when Class4 = 1 | | | |
| ThetaG | Angle of 1rst principle axis of inertia relative to X axis of device. The 2nd principle axis is 90 degrees from the 1rst principle axis | signed int | 1/10 degree increments . . . −900 = −90.0 deg, +900 = 90.0 deg. |
| ECG | Eccentricity: Ratio of the principle moments of inertia: 1rst principle moment divided by 2nd principle moment | unsigned byte | Valid range: 1 = 0.1 to 10 = 1.0 to 255 = 25.5 |
| Output parameters, only available when Class5 = 1 | | | |
| XGinc | Change in XG parameter, not including change in parameter due to change in feature-set | signed int | $\frac{1}{64}$ input pixels |
| YGinc | Change in YG parameter, not including change in parameter due to change in feature-set | signed int | $\frac{1}{64}$ input pixels |
| Output parameters, only available when Class6 = 1 | | | |
| RGinc | Change in RG parameter, not including change in parameter due to change in feature-set | signed int | $\frac{1}{64}$ input pixels |
| Output parameters, only available when Class7 = 1 | | | |
| ThetaGinc | Change in ThetaG parameter, not including change in parameter due to change in feature-set | signed int | 1/10 degree increments |
| Output parameters, only available when Class8 = 1 | | | |
| NPTS | Number of contact patches to be reported | unsigned byte | # of patches |
| For each reported contact patch, the following data will be output . . . | | | |
| PTID | Point ID, facilitates keeping track of contact patches across multiple reports | unsigned byte | ID Label |
| Z | Total integrated signal for the contact patch | unsigned int | |

| Multi-DOF Control Report Output Parameter | Description | Type | Meaning |
|---|---|---|---|
| A | Total area of input pixels which have values higher than 50% of peak for the contact patch | unsigned int | Input pixels |
| X | X coordinate of centroid for the contact patch | unsigned int | $\frac{1}{64}$ input pixels, relative to local control origin |
| Y | Y coordinate of centroid for the contact patch | unsigned int | $\frac{1}{64}$ input pixels, relative to local control origin |
| Output parameters, only available when Class9 = 1 | | | |
| R | Measure of the average distance from centriod to signal in contact patch(es). Analogous to radius of gyration | unsigned int | $\frac{1}{64}$ input pixels |
| Theta | Angle of minimum principle axis of inertia relative to X axis of device. The minimum principle axis corresponds to the long axis for a representative contact patch ellipse. | signed int | 1/10 degree increments . . . −900 = −90.0 deg, +900 = 90.0 deg. |
| EC | Eccentricity: Ratio of the principle moments of inertia: 1rst principle moment divided by 2nd principle moment | unsigned byte | Valid range: 1 = 0.1 to 10 = 1.0 to 255 = 25.5 |

Some algorithms for processing touch data for multi-dof control types are described below. Image data in region after error removal can be represented by array D(p,q) where p can represent the row number, from 0 (bottom) to M−1 (top) and q can represent column number, from 0 (left) to N−1 (right).

Algorithms for Class 0 and Class 1 Output parameters: Ztot, XG, YG, AG are discussed below. For a rectangular mask:

$$Z(p,q) = D(p,q)$$

Binary mask data can be stored in an array of bits M(i,j) where i can represent the row number, from 0 (bottom) to Ylen−1 (top) and j can represent column number, from 0 (left) to Xlen−1 (right). Thus, for a binary mask:

$$Z(p,q) = D(p,q) * M(p,q)$$

Graded mask data can be in an array of unsigned bytes G(i,j) where i can represent the row number, from 0 (bottom) to Ylen−1 (top) and j can represent column number, from 0 (left) to Xlen−1 (right). Thus for a graded mask:

$$Z(p,q) = \frac{D(p,q) * M(p,q)}{256}$$

Ztot can be calculated as follows:

$$Ztot = \frac{\sum_{p=0}^{M-1}\sum_{q=0}^{N-1} Z(p,q)}{2^{ZDIV}}$$

Control Activation Thresholding can be performed according to the following code:
If (CONTROL-ACTIVE==OFF)
    If Ztot>Zon then CONTROL-ACTIVE=ON
If (CONTROL-ACTIVE==ON)
    If Ztot<Zoff then CONTROL-ACTIVE=OFF
AG can be calculated as follows:

$$Peak = \max(Z(p,q))$$
$$thresh = 0.50$$
$$HiFlag(p,q) = \text{if } (Z(p,q) > thresh, 1, 0)$$
$$AG = \sum_{p=0}^{M-1}\sum_{q=0}^{N-1} HiFlag$$

Figure 5:
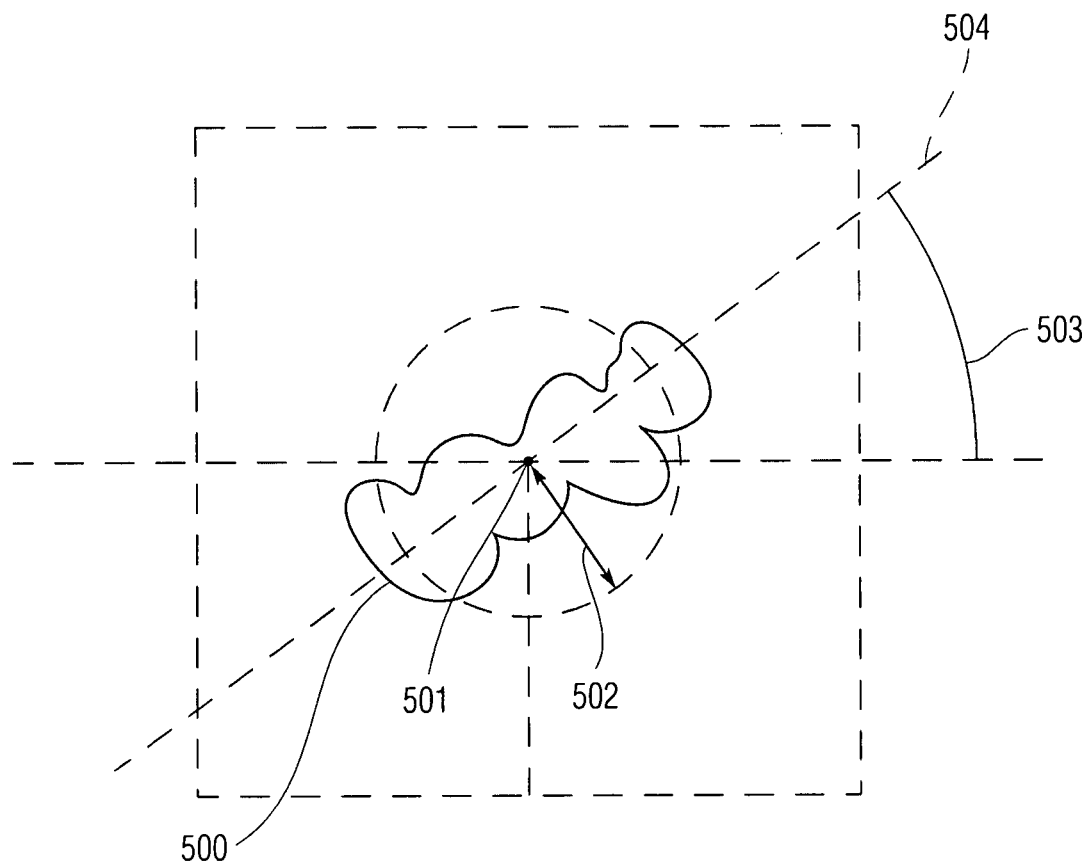
FIG. 5 illustrates processing of touch data for an exemplary control of an exemplary Multi-DOF Control Type according to one embodiment of this invention.

FIG. 5 illustrates processing of touch data for an exemplary control of an exemplary Multi-DOF Control Type. For example, FIG. 5 can relate to a knob control type. Area 500 can be an area that has been sensed as being touched at a first time. Area 500 can result from detecting touches at every single pixel within the area or detecting touches at some pixels of the area, and connecting these pixels to form a continuous area.

Parameters XG and YG can be the X and Y coordinates of centroid 501 of the touch area 500. The centroid can be defined as the point having an average X and Y coordinates of the area 500. RG can be defined as average radius 502 of the area 500. ThetaG can be defined as an angle 503 of first principle axis of inertia 504 relative to X axis of device. The second principle axis of inertia can be perpendicular to the first one.

Centroid calculations for XG, YG can be as follows:

$$XG = \frac{\sum_{p=0}^{M-1}\sum_{q=0}^{N-1} Z(p,q) * q}{Ztot * 2^{ZDIV}} \cdot \frac{1}{64}$$

$$YG = \frac{\sum_{p=0}^{M-1}\sum_{q=0}^{N-1} Z(p,q) * p}{Ztot * 2^{ZDIV}} \cdot \frac{1}{64}$$

The Class2 Output parameter RG can be derived as shown below. It should be noted that Class 1 parameters depend on Class 0 parameters. The moment of bout centroid x axis for group 500 can be:

$$IxG = \sum_{p=0}^{M-1}\sum_{q=0}^{N-1} (p - YG)^2 * Z(p,q)$$

The moment of inertia about centroid y axis for the group can be:

$$IyG = \sum_{p=0}^{M-1}\sum_{q=0}^{N-1} (q - XG)^2 * Z(p,q)$$

The polar moment of inertia about centroid for group can be:
$$IpG = IxG + IyG$$

The polar radius of gyration about centroid can be:

$$RG = \sqrt{\frac{IpG}{Ztot * 2^{ZDIV}}}$$

Output parameter NBG can be an estimate of the number of "bumps" in the group. This can be determined by spatial frequency analysis such as discrete cosine transform algorithms. This may or may not be the same as the number of distinct contact patches.

Algorithms for calculating Class4 output parameters ThetaG, ECG are shown below. It should be noted that Class 3 parameters depend on Class 1 parameters. The product of inertia about the centroid can be calculated as:

$$IxyG = \sum_{p=0}^{M-1}\sum_{q=0}^{N-1} (p - YG) * (q - XG) * Z(p,q)$$

The first principle axis can be calculated as:

$$Theta1 = \frac{1}{2}\tan^{-1}\left(\frac{2 * IxyG}{IxG - IyG}\right)$$

Note: Theta1 ranges from −90 deg. To +90 deg.
The second principle axis can be calculated as:
$$Theta2 = Theta1 + 90$$

Note: Theta2 ranges from 0 deg. To +180 deg.
The first principle moment of inertia can be calculated as:

$$I1G = \frac{IxG + IyG}{2} + \left(\frac{IxG - IyG}{2}\right) * \cos(2 * Theta1) - IxyG * \sin(2 * Theta1)$$

The second principle moment of inertia can be calculated as:

$$I2G = \frac{IxG + IyG}{2} + \left(\frac{IxG - IyG}{2}\right) * \cos(2 * Theta2) - IxyG * \sin(2 * Theta2)$$

The ratio of principle moments of inertia ($1^{st}/2^{nd}$) can be:

$$ECG = \frac{I1G}{I2G}$$

Figure 6:
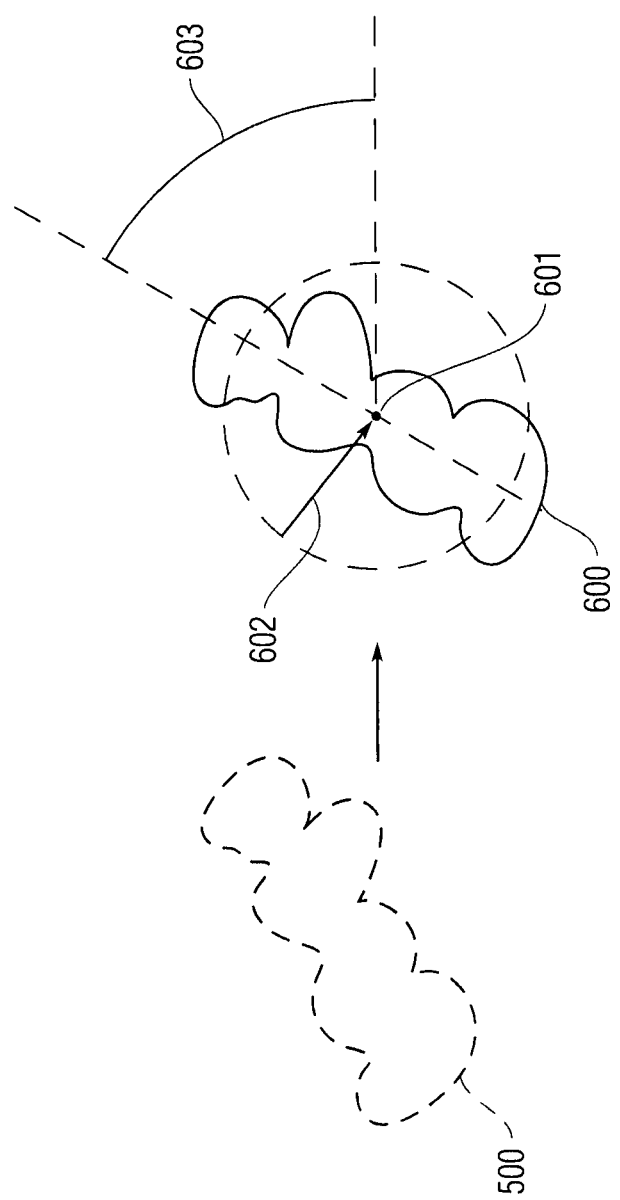
FIG. 6 illustrates processing of the touch data of FIG. 5 at a later time, for an exemplary incremental control according to one embodiment of this invention.

Class5, Class6 and Class7 Output parameters: XGinc, YGinc, Ztotinc, AGinc, RGinc, ThetaGinc can be incremental parameters. In other words they can be intended to measure incremental changes of touch data. For example, FIG. 6 illustrates using incremental parameters. More specifically, FIG. 6 illustrates processing of the touch data of FIG. 5 at a later time, for an exemplary incremental control. The initial touch area 500 of FIG. 500 can at a later time change to touch area 600. New touch area 600 can have new centroid 601 having new coordinates XG and YG, new average radius 6062 (RG) and new angle of first principle axis of inertia 603 (ThetaG).

Incremental parameters XGinc, YGinc, RGinc, ThetaGinc can be calculated as follows when the feature set (number of contact patches/approximate position of contact patches) does not change:

$XGinc=XG-XG\_old$ $YGinc=YG-YG\_old$ $RGinc=RG-RG\_old$

Theta$Ginc$=Theta$G$-Theta$G\_$old where XG_old, YG_old, RG_old and ThetaG_old can be output parameters from the previous stage (see FIG. 5). Note: ThetaGinc can be adjusted to account for abrupt changes due to overflow/underflow of ThetaG past +90 deg. or −90 deg.

Figure 7:
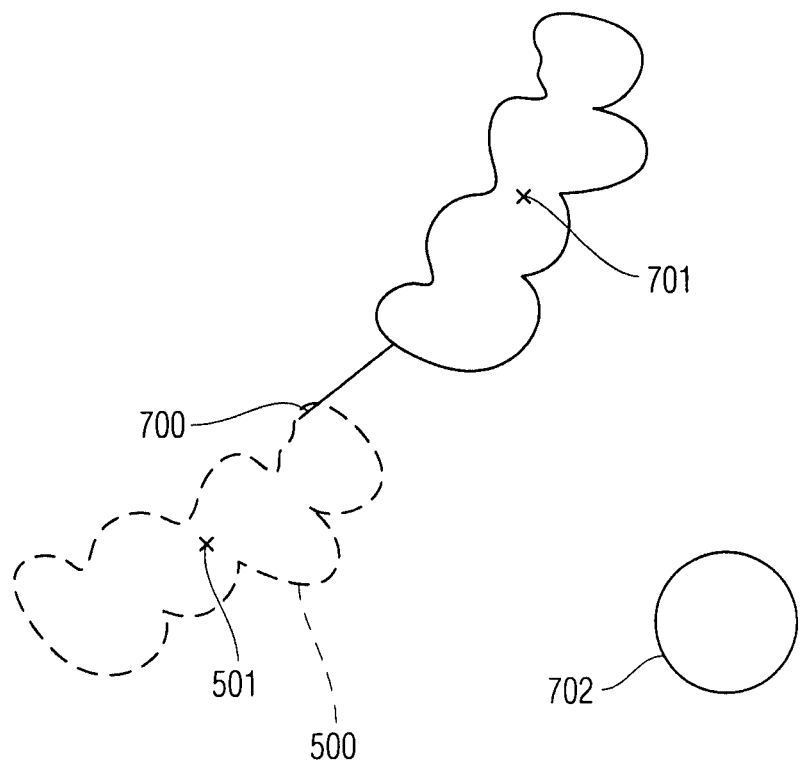
FIG. 7 is diagram showing an exemplary incremental change in which the touch area may move and a new contact patch can appear according to one embodiment of this invention.

FIG. 7 is diagram showing an incremental change in which the touch area may move and a new contact patch can appear. Incremental parameter calculation can change whenever the feature set (e.g., the number and relative positioning of contact patches) changes due to addition, subtraction, merging, or separation of contact patches. FIG. 7 shows an example of how incremental parameters can be calculated in the first frame after a new contact patch arises. In FIG. 7 the position and angle of image 500 has been changed to form image 700 with centroid 701, and a new contact patch 702 has appeared. Assuming that XG_old, YG_old, RG_old, ThetaG_old are outputs from last image 500 with old feature set and XG2, YG2, ThetaG2 are calculated outputs from the NEW image based on the OLD feature set (i.e., ignoring new patch 702), then the incremental values XGinc, YGinc, Rginc and ThetaGinc can be obtained as follows:

$XGinc=XG2-XG\_old$ $YGinc=YG2-YG\_old$ $RGinc=RG2-RG\_old$

Theta$Ginc$=Theta$G2$-Theta$G\_$old

Note: ThetaGinc should be adjusted to account for abrupt changes due to overflow/underflow of ThetaG past +90 deg. or −90 deg.

This method of calculating incremental parameters can provide continuity in spite of the addition, subtraction, merging and separation of contact patches.

Incremental parameter calculation in the first image after a contact patch subtraction can function in a similar fashion. Thus, assuming that XG_old, YG_old, RG_old, ThetaG_old are outputs from NEW image with the OLD feature set and XG3, YG3, RG3, ThetaG3 are calculated outputs from the OLD image based on the NEW feature set, then the incremental values can be obtained as follows:

$XGinc=XG-XG3$ $YGinc=YG-YG3$ $RGinc=RG-RG3$

Theta$Ginc$=Theta$G$-Theta$G3$

Note: ThetaGinc can be adjusted to account for abrupt changes due to overflow/underflow of ThetaG past +90 deg. or −90 deg.

Algorithms for Class 8 Output parameters: NPTS, PTID, Z, X, Y, A, R, Theta, EC are discussed below.

NPTS represents the number of contact patches in the control region. At a high level, a general approach such as the following method can be used:
  pass touch data through spatial low pass filter;
  threshold out noise;
  watershed into regions; and
  limit each region size to pixels above 50% of the peak of the region.

After the contact patch regions are defined, the individual contact patch parameters for each contact patch can be processed with algorithms similar to those for the group parameters already detailed above:

TABLE 9

| (Calculating Individual Contact Patch Parameters Class 8) | |
| --- | --- |
| Individual Contact Patch Parameter | Use Algorithm similar to . . . |
| Z | ZG |
| A | AG |
| X | XG |
| Y | YG |

Once the individual contact patch parameters are established as shown above, PTID for each contact can be found by comparing new vs. last X, Y, Z and A parameters, as well as previous time derivatives of these parameters.

Algorithms for Class9 Output parameters: R, Theta, EC are shown below. The individual contact patch parameters for each contact patch can be processed with algorithms similar to those for the group parameters already detailed above:

TABLE 10

| (Calculating Individual Contact Patch Parameters - Class 9) | |
| --- | --- |
| Individual Contact Patch Parameter | Use Algorithm similar to . . . |
| R | RG |
| Theta | ThetaG |
| EC | ECG |

The above discussed embodiments can allow an SDK to be provided in order to ease the development of software for multi-touch devices. More specifically, the SDK can allow developers to create classes and instances of control types using an intuitive graphical environment and embed them into applications. Thus, developers that are not very familiar with the specifics of multi-touch data processing can nevertheless develop applications using the benefits of a multi-touch display.

A multi-touch capable display can be used in various devices. Thus, embodiments of this invention encompass but are not limited to devices such as cellular phones, portable music players, GPS devices, PDAs, portable email devices, electronic kiosks, computers, and other devices utilizing multi-touch displays.

Figure 8:
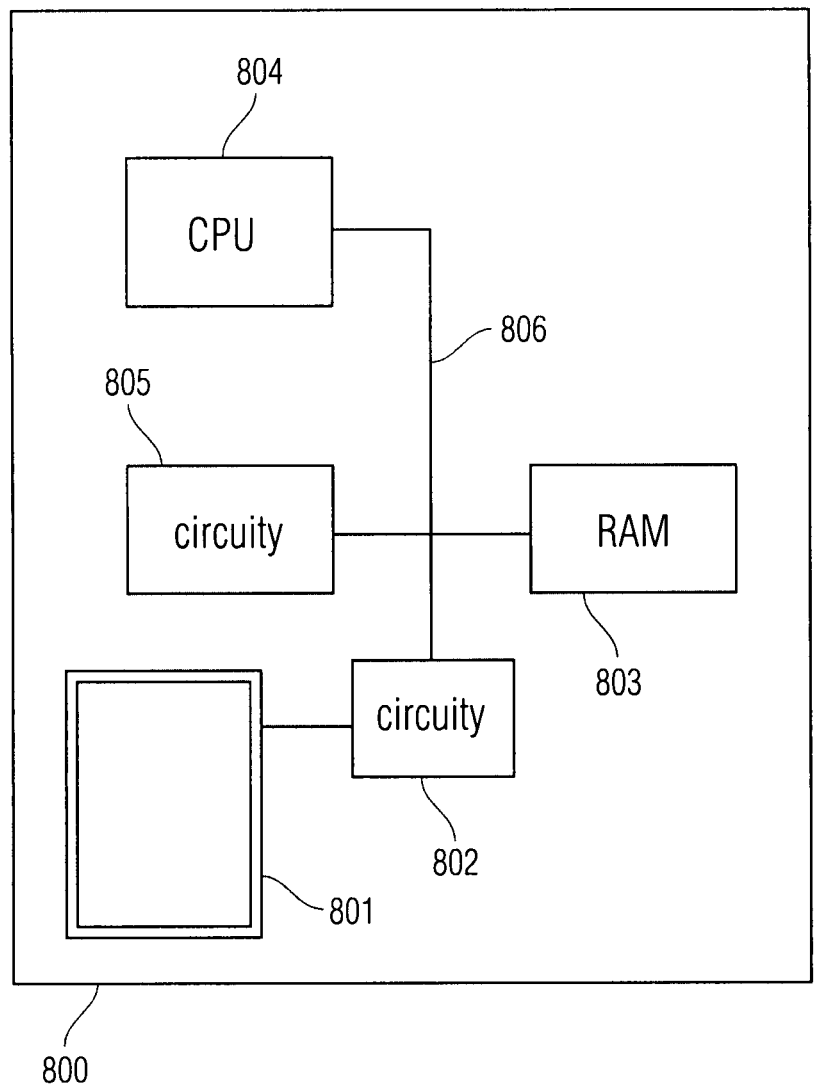
FIG. 8 is a diagram of an exemplary multi-touch enabled device according to one embodiment of this invention.

FIG. 8 is a diagram of a multi-touch enabled device according to an embodiment of the invention. Multi-touch enabled device 800 can include panel 801 that performs both display and multi-touch functionality. The device can also include multi-touch processing circuitry 802 for processing multi-touch data, memory 803 for storing instructions and/or data (the memory can be RAM or another type of memory including non-volatile memory), processor 804, and bus 806 for connecting various elements. The modules shown in FIG. 1 can be implemented at panel 801, circuitry 802 and/or by instructions stored at the memory and executed by the processor.

Although embodiments of the present invention are described herein in terms of a mutual capacitance based multi-touch panels, it should be understood that the present invention is not limited to such embodiments, but is generally applicable to all multi-touch devices and other devices that can receive similar pixel based input in which different pixels can be active at the same time, such as, e.g., proximity sensor devices, camera devices, etc.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for operating a touch enabled device, comprising:
generating by one or more applications executing at the touch enabled device one or more control instances, the control instances defining the types of user operable controls required by the applications;
sending the control instances to a touch utility;
receiving touch data by the touch utility from a touch panel;
instructing a hardware abstraction layer of the touch panel by the touch utility to process only the touch data required to obtain one or more sets of results, wherein each set of results is associated with a respective control instance; and sending to the one or more applications the one or more sets of results.

2. The method of claim 1, further comprising:
displaying one or more interface images at a display of the touch enabled device, each interface image being associated with a control instance; and
detecting one or more touches at one or more of the interface images,
wherein processing the touch data includes:
obtaining the touch data from raster data; and
processing the touch data in a manner associated with the control instance in order to obtain the one or more sets of results.

3. The method of claim 1, wherein the one or more control instances define the format of the sets of results.

4. The method of claim 1, wherein the processing of touch data includes processing current touch data as well as processing historical touch data.

5. The method of claim 4, wherein processing touch data includes comparing the current touch data with historical touch data to obtain incremental results.

6. The method of claim 4, further including:
determining by the touch utility based on the control instances, which received touch data may be needed in the future as historical touch data;
saving the received touch data that may be needed in the future; and
discarding all other received touch data.

7. The method of claim 1, wherein:
processing the touch data further includes deriving intermediate touch data, the intermediate touch data being in a form other than raster data;
the method further including:
saving the intermediate touch data; and
using the intermediate touch data to obtain incremental results.

8. The method of claim 1, wherein the touch data includes a plurality of binary values, each binary value indicating whether a particular pixel is being touched.

9. The method of claim 1, wherein the touch data includes a plurality of values, each value indicating a strength or pressure of touching of a particular pixel.

10. The method of claim 1, wherein each control instance defines a relevant region of the display, and wherein the results associated with each control instance are derived from touch data from the relevant region of the display for the control instance.

11. The method of claim 10, wherein:
one or more control instances include a level parameter, indicating a virtual level of each control instance;
one or more control instances are defined as being opaque; and
processing the touch data further includes, for each opaque instance, removing all touch events for areas of instances at a lower level of the opaque instance which are overlaid by the area of the opaque instance.

12. The method of claim 11, wherein one or more control instances are defined as being transparent and during processing of the touch data instances being overlaid by the transparent instances are not affected.

13. The method of claim 1, wherein each control instance is associated with a control type of one or more control types.

14. The method of claim 1, wherein one of the control instances is a button control instance and the results associated with the button control instance indicate whether a button appearing on the display and associated with the button control instance is being pressed.

15. The method of claim 1, wherein one of the control instances is a slider control instance and the results associated with the slider control instance indicate incremental changes of the position of an object or objects along a slider appearing on the display and associated with the slider control instance.

16. The method of claim 1, wherein one of the control instances is a knob control instance and the results associated with the knob control instance indicate incremental changes of the rotational orientation of an object or objects along a knob appearing on the display and associated with the knob control instance.

17. The method of claim 1, wherein one of the control instances is a navigational surface control instance and the results associated with the navigational surface control instance indicate incremental changes of the relative positions of several objects along a navigational surface appearing on the display and associated with the navigational surface control instance.

18. A non-transitory computer readable medium comprising touch utility software configured to be executed at a processor of a touch enabled device, the processor also executing one or more applications, the touch utility software being configured to:
  receive one or more control instances from the applications, the control instances defining the types of user operable controls required by the applications;
  receive touch data from a touch panel;
  instructing a hardware abstraction layer of the touch panel by the touch utility to process only the touch data required to obtain one or more sets of results, wherein each set of results is associated with a respective control instance; and
  send to the one or more applications the one or more sets of results.

19. The non-transitory computer readable medium of claim 18, wherein the software is further configured to cause the processor to:
  display one or more interface images at a display of the touch enabled device, each interface image being associated with a control instance, a user being allowed to touch one or more of the interface images,
  wherein the touch data includes data indicating one or more touches at the one or more interface images, and processing the touch data includes:
    obtaining the touch data from raster data; and
    processing the touch data in a manner associated with the control instance in order to obtain the one or more sets of results.

20. The non-transitory computer readable medium of claim 18, wherein the one or more control instances define the format of the sets of results.

21. The non-transitory computer readable medium of claim 18, wherein the processing of touch data includes processing current touch data as well as processing historical touch data.

22. The non-transitory computer readable medium of claim 21, wherein processing touch data includes comparing the current touch data with historical touch data to obtain incremental results.

23. The non-transitory computer readable medium of claim 21, wherein the software is configured to further cause the processor to:
  determine, based on the control instances, which received touch data may be needed as historical touch data;
  save the received touch data that may be needed as historical touch data; and
  discard all other received touch data.

24. The non-transitory computer readable medium of claim 18, wherein:
  processing the touch data further includes deriving intermediate touch data, the intermediate touch data being in a form other than raster data;
  wherein the software is further configured to cause the processor to:
    save the intermediate touch data; and
    use the intermediate touch data to obtain incremental results.

25. The non-transitory computer readable medium of claim 18, wherein the touch data includes a plurality of binary values, each binary value indicating whether a particular pixel is being touched.

26. The non-transitory computer readable medium of claim 18, wherein the touch data includes a plurality of values, each value indicating a strength or pressure of touching of a particular pixel.

27. The non-transitory computer readable medium of claim 18, wherein each control instance defines a relevant region of the display, and wherein the results associated with each control instance are derived from touch data from the relevant region of the display for the control instance.

28. The non-transitory computer readable medium of claim 27, wherein:
  one or more control instances include a level parameter, indicating a virtual level of each control instance;
  one or more control instances are defined as being opaque; and
  processing the touch data further includes, for each opaque instance, removing all touch events for areas of instances at a lower level of the opaque instance which are overlaid by the area of the opaque instance.

29. The non-transitory computer readable medium of claim 28, wherein one or more control instances are defined as being transparent, and during processing of the touch data, instances being overlaid by the transparent instances are not affected.

30. The non-transitory computer readable medium of claim 18, wherein each control instance is associated with a control type of one or more control types.

31. The non-transitory computer readable medium of claim 18, wherein one of the control instances is a button control instance and the results associated with the button control instance indicate whether a button appearing on the display and associated with the button control instance is being pressed.

32. The non-transitory computer readable medium of claim 18, wherein one of the control instances is a slider control instance and the results associated with the slider control instance indicate incremental changes of the position of an object or objects along a slider appearing on the display and associated with the slider control instance.

33. The non-transitory computer readable medium of claim 18, wherein one of the control instances is a knob control instance and the results associated with the knob control instance indicate incremental changes of the rotational orientation of an object or objects along a knob appearing on the display and associated with the knob control instance.

34. The non-transitory computer readable medium of claim 18, wherein one of the control instances is a navigational surface control instance and the results associated with the navigational surface control instance indicate incremental changes of the relative positions of several objects along a navigational surface appearing on the display and associated with the navigational surface control instance.

35. A touch utility circuit included in a touch enabled device, the touch enabled device also including a processor, the processor executing one or more applications, the touch utility circuit configured to:
  receive one or more control instances from the applications, the control instances defining the types of user operable controls required by the applications;
  receive touch data from a touch panel;
  instructing a hardware abstraction layer of the touch panel to process only the touch data required to obtain one or more sets of results, wherein each set of results is associated with a respective control instance; and
  send to the one or more applications the one or more sets of results.

36. A touch enabled device comprising:
  a display having a touch panel integrated therein;
  a memory;
  a processor;
  a touch utility stored in the memory and executed by the processor; and
  one or more applications stored in the memory, executed by the processor and configured to cause the processor to generate one or more control instances and send them to the touch utility,
  wherein the touch utility is further configured to:
    receive one or more control instances from the applications, the control instances defining the types of user operable controls required by the applications;
    receive touch data from the touch panel;
    instructing a hardware abstraction layer of the touch panel to process only the touch data required to obtain one or more sets of results, wherein each set of results is associated with a respective control instance; and
    send to the one or more applications the one or more sets of results.

37. The touch enabled device of claim 36, wherein the touch utility is further configured to cause the processor to:
  display one or more interface images at the display, each interface image being associated with a control instance, and detecting one or more touches at one or more of the interface images,
  wherein processing the touch data includes:
    obtaining the touch data from raster data; and
    processing the touch data in a manner associated with the control instance in order to obtain the one or more sets of results.

38. The touch enabled device of claim 36, wherein the one or more control instances define the format of the sets of results.

39. The touch enabled device of claim 36, wherein the processing of touch data includes processing current touch data as well as processing historical touch data.

40. The touch enabled device of claim 39, wherein processing touch data includes comparing the current touch data with historical touch data to obtain incremental results.

41. The touch enabled device of claim 39, wherein the touch utility is configured to further cause the processor to:
  determine, based on the control instances, which received touch data may be needed as historical touch data;
  save the received touch data that may be needed as historical touch data; and
  discard all other received touch data.

42. The touch enabled device of claim 36, wherein:
  processing the touch data further includes deriving intermediate touch data, the intermediate touch data being in a form other than raster data;
  wherein the touch utility is further configured to cause the processor to:
    save the intermediate touch data; and
    use the intermediate touch data to obtain incremental results.

43. The touch enabled device of claim 36, wherein the touch data includes a plurality of binary values, each binary value indicating whether a particular pixel is being touched.

44. The touch enabled device of claim 36, wherein the touch data includes a plurality of values, each value indicating a strength or pressure of touching of a particular pixel.

45. The touch enabled device of claim 36, wherein each control instance defines a relevant region of the display, and wherein the results associated with each control instance are derived from touch data from the relevant region of the display for the control instance.

46. The touch enabled device of claim 45, wherein:
  one or more control instances include a level parameter, indicating a virtual level of each control instance;
  one or more control instances are defined as being opaque; and
  processing the touch data further includes for each opaque instance removing all touch events for areas of instances at a lower level of the opaque instance which are overlaid by the area of the opaque instance.

47. The touch enabled device of claim 46, wherein one or more control instances are defined as being transparent and during processing of the touch data instances being overlaid by the transparent instances are not affected.

48. The touch enabled device of claim 36, wherein each control instance is associated with a control type of one or more control types.

49. The touch enabled device of claim 36, wherein one of the control instances is a button control instance and the results associated with the button control instance indicate whether a button appearing on the display and associated with the button control instance is being pressed.

50. The touch enabled device of claim 36, wherein one of the control instances is a slider control instance and the results associated with the slider control instance indicate incremental changes of the position of an object or objects along a slider appearing on the display and associated with the slider control instance.

51. The touch enabled device of claim 36, wherein one of the control instances is a knob control instance and the results associated with the knob control instance indicate incremental changes of the rotational orientation of an object or objects along a knob appearing on the display and associated with the knob control instance.

52. The touch enabled device of claim 36, wherein one of the control instances is a navigational surface control instance and the results associated with the navigational surface control instance indicate incremental changes of the relative positions of several objects along a navigational surface appearing on the display and associated with the navigational surface control instance.

53. The touch enabled device of claim 36, wherein the touch enabled device is a mobile telephone.

54. The touch enabled device of claim 36, wherein the touch enabled device is an audio player.

55. A mobile telephone comprising:
  a display having a touch panel integrated therein;
  a memory;
  a processor;
  a touch utility stored in the memory and executed by the processor; and one or more applications stored in the memory, executed by the processor and configured to cause the processor to generate one or more control instances and send them to the touch utility, wherein the touch utility is further configured to:
receive one or more control instances from the applications, the control instances defining the types of user operable controls required by the applications;
receive touch data from the touch panel;
instructing a hardware abstraction layer of the touch panel by the touch utility to process only the touch data required to obtain one or more sets of results, wherein each set of results is associated with a respective control instance; and
send to the one or more applications the one or more sets of results.

56. An audio player comprising:
a display having a touch panel integrated therein;
a memory;
a processor;
a touch utility stored in the memory and executed by the processor; and
one or more applications stored in the memory, executed by the processor and configured to cause the processor to generate one or more control instances and send them to the touch utility,
wherein the touch utility is further configured to:
receive one or more control instances from the applications, the control instances defining the types of user operable controls required by the applications;
receive touch data from the touch panel; determine if any of the raster touch data is relevant to any of the control instances;
instructing a hardware abstraction layer of the touch panel by the touch utility to process only the touch data required to obtain one or more sets of results, wherein each set of results is associated with a respective control instance; and
send to the one or more applications the one or more sets of results.

57. A non-transitory computer readable medium comprising an SDK, the SDK being configured to be executed at a software development computer and to cause the processor of the software development computer to:
allow creation of an application for a touch enabled device;
generate code defining one or more control instances and place said code within the application, the control instances defining the types of user operable controls required by the application;
wherein the application is configured to be executed at a processor of a touch enabled device to
send the one or more control instances to a touch utility; and
receive from the touch utility one or more sets of results, the results, each set of results being associated with a respective control instance and indicating interaction with the visual interface element associated with said control instance,
wherein each set of results is obtained by a touch utility instructing a hardware abstraction layer of a touch panel to process processing only raster touch data required by at least one of the control instances.

58. A touch enabled device comprising:
a touch enabled display;
one or more applications; and
a touch utility,
wherein the one or more applications are configured to send control instances to the touch utility, the control instances defining the types of user operable controls required by the application;
wherein the touch utility is configured to display the user interface elements defined by the control instances at the display, to process touch events resulting from interaction with the interface elements at the display, the touch events captured in raster touch data, and to send results indicative of the interaction with the interface elements and associated with respective control instances to the one or more applications, and
wherein the results are obtained by instructing a hardware abstraction layer of the touch enabled display to process only the touch data required by at least one of the control instances.

59. The touch enabled device of claim 58, wherein each control instance further comprises data defining methods for processing in coming touch data for that instance.

60. A method for operating a touch enabled device comprising a touch enabled display, one or more applications and a touch utility, the method comprising:
sending one or more control instances by the one or more applications to the touch utility, the control instances defining the types of user operable controls required by the application, each control instance defining a user interface element;
displaying the user interface elements defined by the control instances at the display;
detecting a touch at one or more of the user interface elements;
processing touch data resulting from the user touching the interface elements;
generating results by instructing a hardware abstraction layer of the touch enabled display to process only the touch data required by at least one of the control instances; and
sending the results indicative of the detected touching of the interface elements and associated with respective control instances to the one or more applications.

61. The method of claim 60, wherein each control instance further comprises data defining methods for processing in coming touch data for that instance.

* * * * *